United States Patent
Doré et al.

(10) Patent No.: US 11,899,758 B2
(45) Date of Patent: Feb. 13, 2024

(54) SOFTWARE TAMPER RESISTANCE

(71) Applicant: NAGRAVISION SÀRL, Cheseaux-sur-Lausanne (CH)

(72) Inventors: Laurent Doré, Cheseaux-sur-Lausanne (CH); Christian Mönch, Cheseaux-sur-Lausanne (CH); Brecht Wyseur, Cheseaux-sur-Lausanne (CH)

(73) Assignee: Nagravision Sàrl, Cheseaux-sur-Lausanne (CH)

( * ) Notice: Subject to any disclaimer, the term of this patent is extended or adjusted under 35 U.S.C. 154(b) by 0 days.

(21) Appl. No.: 17/271,259

(22) PCT Filed: Aug. 30, 2019

(86) PCT No.: PCT/EP2019/073187
§ 371 (c)(1),
(2) Date: Feb. 25, 2021

(87) PCT Pub. No.: WO2020/043871
PCT Pub. Date: Mar. 5, 2020

(65) Prior Publication Data
US 2021/0342420 A1 Nov. 4, 2021

(30) Foreign Application Priority Data
Aug. 31, 2018 (EP) .................................. 18306155

(51) Int. Cl.
*G06F 21/14* (2013.01)

(52) U.S. Cl.
CPC ...... *G06F 21/14* (2013.01); *G06F 2221/0748* (2013.01)

(58) Field of Classification Search
CPC .......................... G06F 21/14; G06F 2221/0748
(Continued)

(56) References Cited

U.S. PATENT DOCUMENTS 10,467,390 B1 * 11/2019 Wehrli .................... G06F 21/14
11,250,110 B2 * 2/2022 Garreau ................ G06F 21/125
2015/0310193 A1 10/2015 Hoogerbrugge et al.

FOREIGN PATENT DOCUMENTS

WO 2018 050335 A1 3/2018

OTHER PUBLICATIONS

Jan Cappaert, "Code Obfuscation Techniques for Software Protection", Apr. 2012 (2012-64), XP055188184, Retrieved from the Internet: URL:https://www.cosic.esat.kuleuven.be/publications/thesis-199.pdf.
(Continued)

*Primary Examiner* — Michael S McNally
(74) *Attorney, Agent, or Firm* — HOYNG ROKH MONEGIER B.V.; David P. Owen

(57) ABSTRACT

The present disclosure relates to software tampering resistance. In one aspect, a method for generating protected code is provided, comprising identifying a primary function in code to be obscured, the primary function being a function used to verify the integrity of the code run-time. The method then comprises generating a finite state machine from the primary function, wherein a state of the finite state machine at a given instance defines an element of the primary function to be executed. The method then comprises distributing the finite state machine throughout the code to obscure one or more areas of the code.

12 Claims, 5 Drawing Sheets

(58) Field of Classification Search
USPC .......................................................... 726/26
See application file for complete search history.

(56) References Cited

OTHER PUBLICATIONS

Monden A et al, "A Framework for Obfuscated Interpretation", Proceedings of the Australasian Information Security Workshop, Department of Computer Science, University of Aukland & Graduate school of Information Science Nara Institute of Si. & Tech. Jan. 22, 2004 (2884-01-22), pp. 7-16, XP882553966, ISBN: 978-1-928682-14-9, Retrieved from URL:http: //crpit.corn/confpapers/CRPITV32Monden.pdf.

* cited by examiner

SOFTWARE TAMPER RESISTANCE

FIELD

The present disclosure relates to software security, particularly to protection of software functions from reverse engineering or tampering attacks.

BACKGROUND

Software applications may be a target of reverse engineering or software tampering attacks. To make them less prone to such attacks, various software protection techniques can be deployed. Such protection techniques are typically implemented by modifying the original code to alter its structure and/or add extra security functions such as run-time integrity verification functions.

In practice, however, the security functions themselves may be subject to malicious identification and analysis. Indeed, they are often particularly vulnerable to identification as they may be called frequently in order to provide continuous verification of the integrity of the code at run-time. If an attacker can identify these functions, they may be able to disable or otherwise impede these security functions, reducing the efficacy of protection techniques which rely upon them.

Solutions have been proposed to attempt to protect such security functions. For example, the control flow of the application may be obscured in an attempt to disguise the security functions. However, such approaches introduce significant complexity and run-time overhead.

BRIEF DESCRIPTION OF THE DRAWINGS

Aspects and embodiments of this disclosure are now described by way of example for the purpose of illustration and with reference to the accompanying drawings, in which:

FIG. 1b is a flow chart depicting the steps to implement an embodiment relating to FIG. 1a.

DETAILED DESCRIPTION OF THE DRAWINGS

Figure 1A:
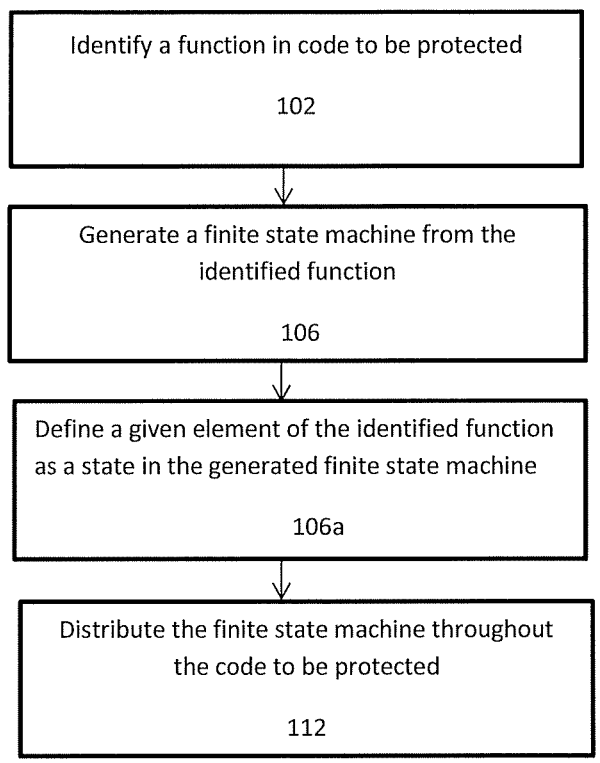
FIG. 1a is a flow chart depicting the steps to implement a first aspect of the present disclosure.

In overview, methods for generating protected code for software applications are provided. The code is a software program that is understood to comprise a set of programming instructions which can be executed on one or more computing devices. The computing devices typically may comprise a processor and a memory. The processor is configured to execute the code, and the memory is configured to store the code, i.e. programming instructions, along with data and variables that may be required for executing the programming instructions. When the code is executed, this is referred to as run-time. The code can be written using a known programming language such as C, C++, Visual Basic, Python, Java etc.

In accordance with a first aspect of the disclosure, a method for software tamper resistance identifies a primary function of the code to be protected. A finite state machine (FSM) may then be generated from the identified primary function. An FSM is understood to be a mathematical model of computation. The FSM may be considered as an abstract machine that can be in exactly one of a finite number of states at any given instance. In some implementations of the first aspect, a present state of the FSM, at a given instance, defines an element of the identified primary function to be executed.

In some embodiments, the primary function may be one that is used to verify the integrity of the code at run-time. Therefore, the primary function may be called or repeated often during execution of the code. In some implementations, the FSM generated from the primary function can change from one state to another, in response to one or more conditions or actions. The one or more conditions or actions may be triggered, for example, by external or internal inputs or by setting a variable such as a control variable. The change from one state of the FSM to another is called a state transition. In example implementations, an FSM is defined by a list of its states, an initial state of the FSM, and the conditions for each transition.

Accordingly, in some embodiments, a given element of the FSM relates to a state of the FSM, which in turn defines a corresponding element of the primary function. The elements of the FSM may then be distributed across the code. For example, the elements of the FSM may be embedded in other functions (besides the primary function) within the code.

As a consequence, the identified primary function may be distributed amongst the code such that the elements of the primary function are not all located proximately to each other. This inhibits efforts by a malign party to identify and analyse the code. This is in contrast to conventional techniques in which security functions are generally in a small area of the protected application, which may make it easier for an attacker to analyse them. The use of an FSM comprising separate elements that correspond to the elements of the primary function allows distribution of the primary function without affecting the operation of the primary function at run time.

In some embodiments, the identified primary function may be inlined along with any sub functions that are to be called or accessed, when the primary function is executed at run time. In some implementations, inlining the primary function may be done prior to generating the FSM for the primary function. To inline the primary function, any call instructions to sub functions and/or external functions that are included or relied on by the elements of the primary function are replaced with the actual code of the sub function or external function called. This will result in a large and duplicated code for the primary function. This reduces external calls or jumps to defined areas when the code including the primary function is executed at run time. In consequence, this inhibits efforts by a malign party to identify function call patterns in the code in an attempt to analyse the location of the primary function based on sub functions or external functions that are called by the elements of the primary function.

In some embodiments, generating an FSM from the primary function, i.e. a primary FSM, includes flattening the primary function. Flattening is an obfuscation technique by which the primary function can be transferred into an FSM, which is contained within the resulting flattened function. By flattening the primary function, granularity of the primary function can be adjusted. This adjustment, when based on each individual element of the primary function taken as a basic block, will increase the number of states in the FSM. Whereas, considering compound statements including a combination of elements of the primary function as a basic block will reduce the number of states. In consequence, flattening results in further obfuscation of the primary function. In some embodiments, flattening relates to rewriting a program or code that represents the primary function such that any logical dependencies between its basic blocks are removed. For example, all basic blocks of the primary function, which may originally be at different nesting levels in the code may be separated out and arranged in the primary function such that they are all at equal level (no nesting). Each of these separated blocks in the described embodiments may represent a state of an FSM. Each separated block may be individually selected, i.e. using a switch statement or the like in the language of the code, such as C++, used to implement the primary function. Correct flow of control between the separated basic blocks may be ensured by a control variable which may, for instance, be set at the end of each basic block to indicate which block should be jumped to next. In some examples, the control variable may be updated after each separated basic block is executed.

In some embodiments, the method of providing software tamper resistance may comprise generating secondary FSMs from other functions of the code, separate to the primary function. This implementation may serve to obscure the elements of the primary function from identification from within elements of the secondary FSMs. Structural distinctions between elements of the primary function and the other or secondary functions before such elements are incorporated can then be further obscured by the process of generating secondary FSMs.

In some embodiments, one or more secondary functions may be incorporated into the primary function prior to generating the primary FSM. This can further reduce dependencies on external functions, assisting effective transformation of the primary function into an FSM.

Some specific components and embodiments are now described by way of illustration with reference to the accompanying drawings, in which like reference numerals refer to like features With reference to FIG. 1a, a method for software tamper resistance according to a first aspect of the present disclosure shown.

In Step 102, a primary function in code (a software program) to be protected is identified. In some implementations, the primary function may be one that is used to verify the integrity of the code at run-time and therefore, may be called or repeated often during execution of the code. For example, in some implementations the primary function may be a void function which does not return a value. In some implementations, the primary function is executed to perform background checks.

In step 106, a finite state machine (FSM) is generated from the identified primary function in step 102. For example, one embodiment of generating an FSM may be to flatten the primary function, thereby representing each element of the primary function to be executed in a linear order. In some implementations, this means expanding the elements of the primary function to be expressed in linear succession, without any parallel or conditional execution paths. In some implementations, an element of the primary function may be a statement of the primary function code that can be executed to provide an intermediate result. The intermediate result may be one that is required for a subsequent element of the primary function. An FSM generated from the primary function includes all such elements of the primary function.

The FSM generated from the primary function can be in one of a finite number of states at any given time. In step 106a, each of the elements of the flattened primary function correspond to a state in the generated FSM. In other words, a state of the FSM, at a given instance, defines an element of the primary function to be executed. In some implementations, the elements of the flattened primary function may be considered to be basic blocks of the FSM or pico (small) functions of the original primary function.

In step 112, the FSM is distributed throughout the code that includes the primary function. Each state of the FSM corresponds to a given element of the primary function. Therefore, even when the FSM is distributed throughout the code, the operation and integrity of the primary function is still preserved and will be executed linearly, i.e. one state after another, in the FSM generated from the primary function. Therefore, the source code of a primary function is no longer present or saved as a single or compact area of code. The source code of the primary function is split and diffused throughout the rest of the code or software program. Furthermore, as elements of the FSM, which correspond to elements of the primary function are now expressed linearly, there will be no clear relationship apparent between these distributed code areas. In other words, there does not need to be direct calls or jumps between the distributed FSM.

Figure 1B:
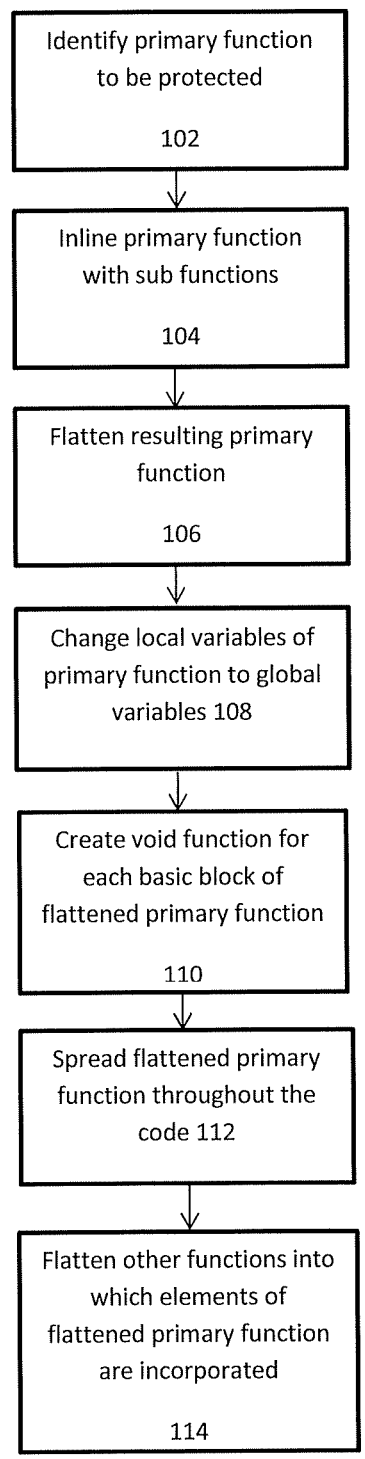

With reference to FIG. 1b, an exemplary embodiment for implementing the first aspect of the present disclosure is shown.

In step 102, a primary function in the code to be protected is identified, like step 102 in FIG. 1a. In some implementations, the primary function is considered a 'top' function which can be parallelized within the software application. This could typically be a void(void) function which performs background checks. In one example, the primary function may be a non-recursive function capable of single-thread execution, such as the primary function code in Code Example 1 shown below, provided only as an example herein.

Code Example 1—Original Primary Function:

```
extern int global_check;
void check(void) {
    while(1) {
        if (!global_check) {
            crash( );
        }
    }
}
```

The primary function of the present disclosure is not limited in any way to the type of function shown in Code Example 1.

For instance, in cases where multi-threaded code is used for the primary function, a Thread-local storage (TLS) may be used. TLS is a computer programming method that uses static or global memory local to a thread, where all threads of the primary function share a same virtual address space. With TLS, specific elements to each thread can be provided, that the primary function can access using a global index, i.e. an index that can be accessed anywhere in the code, not limited to within the primary function. One thread allocates the index, which can be used by the other threads of the primary function to retrieve data specific to a given thread associated with the index.

If the primary function is one including recursive calls, one example implementation could be addressed by using a dedicated stack, i.e. a reserved area of memory for execution, for implementing the described embodiments.

Figure 2:
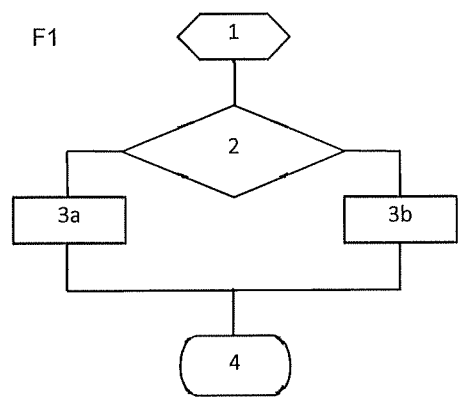
FIG. 2 schematically illustrates a primary function in original form, the primary function relating to the embodiment of FIG. 1b.

FIG. 2 shows a flow diagram representing a primary function F1. F1 in its original form is seen as including the following elements:

1—To initialize or prepare F1

2—A decision is made before progressing further, where the outcome of 2 dictates if processing element 3a should follow as the next step, or if processing element 3b is the next step 4—To define the end of the operation of F1.

Primary function F1 and the above elements will be considered henceforth in the detailed description of the disclosure in relation to FIG. 1b for simplicity and ease of explanation of the operation of the present embodiments. The present disclosure is in no way to be considered as limited to the example implementation of F1 explained herein.

Returning to FIG. 1b, in step 104, if there are any call instructions within the primary function, then the primary function may be inlined, along with any sub functions that are to be called or accessed when the primary function is executed at run time. When any external function call instruction is encountered in the code at run time, a software program would typically store a memory address of the instructions immediately following a call statement, load a sub function being called into the memory, copy argument values, jump to a memory location of the called function, execute the function code, store the return value of the function, and then jump back to the address of the instruction that was saved just before executing the called function. However, when sub functions are inlined, for instance in an object-oriented programming language like C++, the sub function call statement is replaced with the function code itself. A compiler would then compile the entire code, including the sub function code. Thus, with inlined sub functions, a compiler does not have to jump to another location to execute the sub function, and then jump back to the area of the primary function, as the code of the called sub function will already be available to the calling program, which in this case is the primary function. This would result in a bigger primary function which does not have to depend on any external sub function, as these would simply be available in the code itself.

In step 106, the resultant primary function from step 104 is flattened, as previously described in relation to step 106 and 106a in FIG. 1a. As previously mentioned, flattening is an obfuscation technique that has the effect of transforming the resultant function to an FSM, contained within the resultant primary function.

Figure 3:
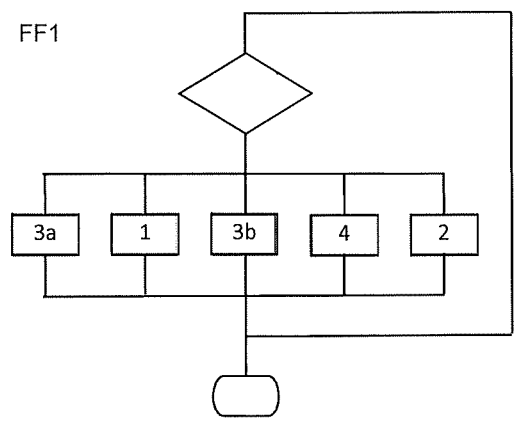
FIG. 3 schematically illustrates the primary function of FIG. 2 after flattening.

Referring now to the primary function F1 shown in FIG. 2, after flattening in step 106 of FIG. 1b (with inlining if there are any sub functions in F1, or without inlining if there are no call instructions to sub functions), F1 is transformed to an FSM as shown in the flow chart of FIG. 3, where each of the elements of the FSM correspond to a state of the FSM at a given instance, expressed linearly in the FSM identified as FF1, i.e. flattened F1 in FIG. 3.

Returning to FIG. 1b, in step 108, if there are any local variables in the elements of the original primary function, these are converted into global variables. This is because, if the primary function has local variables, these will be declared within the primary function, and can be used only within the primary function. Once the elements of the primary have been inlined and/or flatted, as described in steps 104 and 106 (and seen in FIG. 3), local variables may no longer be accessible. Therefore, any local variables are declared as global variable outside the original primary function in step 108. This means that the variables can be accessed and used anywhere in the code instead of only within the original primary function in the code. Declaring the local variables to be global, as described above, will be suitable for a single-thread, non-recursive implementation of the primary function. Another approach is to move local variables to a secondary, user-managed, thread-local stack, instead of converting to global variables. This alternative approach would be suitable for multi-threaded, recursive implementations of the primary function.

With reference to Code Example 1, the code after inlining in step 104, flattening in step 106 and transforming variable scope in step 108, may then be transformed to the code seen below in Code Example 2, which shows code for the inlined and flattened primary function.

Code Example 2—Flattened Primary Function Code

```
extern int global_check;
int global_check_state = 0;
int global_check_if = 0;
void check_fsm_core(void) {
    switch (global_check_state) {
        case 0:
            global_check_if = (!global_check);
            global_state = 1;
            break;
        case 1:
            global_state = (global_check_if) ? 2 : 0;
            break;
        case 2:
            crash( );
            global_state = 0;
        default:
            /* do nothing */
        }
}
```

In step 110 of FIG. 1b basic blocks for the FSM generated in step 108 from the primary function are identified. Granularity of FSM can be adjusted based on the basic blocks selected. This adjustment is based on one or more elements of the FSM, i.e. corresponding to one or more elements of the primary function which can be considered either alone or together, for execution to obtain an intermediate result for the primary function. Such one or more elements can be a basic block.

In some implementations, each individual element of the FSM is taken as basic block. This will increase the number of states in the FSM. Whereas, if a combination of elements of the FSM, i.e. representing compound statements in the primary function, are taken as basic blocks in other implementations, this will reduce the number of states. Once basic blocks of the FSM are identified, a void(void) function for each basic block of the FSM is created or generated. By this, each basic block will then be transformed into a partial FSM of the FSM created for the primary function. Each partial FSM can be placed anywhere in the code, irrespective of the primary function elements that are present in each partial FSM.

In step 112, the partial FSMs obtained from step 110 are distributed throughout the body of the code. In some implementations, the partial FSMs are distributed within other functions of the code, unrelated to the primary function. The other functions may be sub functions that are related to the primary function, or secondary external functions. Calls or indications for or relating to one or more partial FSMs are spread throughout the code. In some implementations, the distribution of the partial FSMs for execution in the code may be fully inlined with one or more other secondary or sub functions. As with step 104 of FIG. 1b, the inlining reduces reliance of external calls and functions. In other implementations, the distribution of the partial FSMs can be partially inlined by diversifying some elements of each partial FSM, but not all, which could be inlined across the code. In some implementations, the basic blocks of the FSM could also be inlined within each partial FSM and/or be called from within each partial FSM. This ensures that the code for primary function distributed using the partial FSMs is large and duplicated, thereby making any analysis by a malign party difficult.

With reference to Code Example 2, the code after distribution of partial FSMs within the code body in steps 110 and 112 of FIG. 1b is changed to the code seen below in Code Example 3, which shows the code generated with partial FSMs inlined in other functions of the code.

Code Example 3—Partial FSMs with Other Functions of the Code

```
extern int global_check;
int global_check_state = 0;
int global_check_if = 0;
void check_fsm_state_0(void) {
        global_check_if = (!global_check);
        global_state = 1;
}
void check_fsm_state_1(void) {
        global_state = (global_check_if) ? 2 : 0;
}
void check_fsm_state_2(void) {
        crash( );
        global_state = 0;
}
int function_add(int a, int b) {
    /* Example external function, where the fsm is partially inlined. */
    switch (global_check_state) {
    case 0:
            /* Here, the state is referenced as an external function. */
            check_fsm_state_0( );
            break;
    case 1:
            /* Here, the state is inlined. */
            global_state = (global_check_if) ? 2 : 0;
            break;
    default:
        /* do nothing. This makes function_sub NOT implement state 2. */
        /* other states will be handled by other functions. */
    }
    return a+b;
}
int function_sub(int a, int b) {
    /* Example external function, where the fsm is partially inlined. */
    switch (global_check state) {
    case 0:
            /* Here, the state is referenced as an external function. */
            check_fsm_state_0( );
            break;
    case 1:
            /* Here, the state is inlined. */
            global_state = (global_check_if) ? 2 : 0;
            break;
    default:
        /* do nothing. This makes function_sub NOT implement state 2. */
        /* other states will be handled by other functions. */
    }
    return a−b;
}
int function mul(int a, int b) {
switch (global_check_state) {
    case 1:
            global_state = (global_check_if) ? 2 : 0;
            break;
    case 2:
            crash( );
            global_state = 0;
    default:
        /* do nothing. This makes function_mul NOT implement state 0. */
        /* other states will be handled by other functions. */
    }
    return a*b;
}
```

We now refer to the FSM in FIG. 3 including the flattened primary function FF1 of primary function F1 shown in FIG. 2. After inlining primary function F1 with one or more sub functions in step 104 and flattening F1 in step 106 to generate the FSM and transform any local variables of F1 to global variables in step 108; the elements of the FSM can then be separated as a plurality of partial FSMs. The partial FSMs are shown in FIG. 4, which can each be executed in one or more combinations with other partial FSMs for achieving the same operation of the primary function F1.

Figure 4:
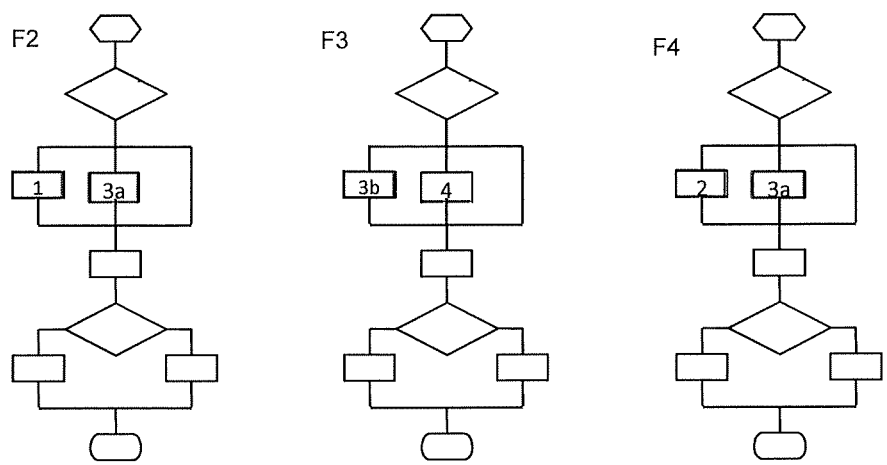
FIG. 4 schematically illustrates the distribution of the flattened function of FIG. 3, amongst other functions.

This outcome can be seen in the flowchart in FIG. 4, showing partial FSMs F2, F3 and F4. As depicted in the FIG. 4:

F2 includes primary functions elements 1 and 3a
F3 includes primary function elements 3b and 4
F4 includes primary function elements 2 and 3a.

Based on a linear state transition or traversal method or order used (these relate to known state traversal methods), the primary function can be executed by any one of the following state transitions:

F1=F2-F4-F3-F3
F1=F2-F3-F4-F2-F3-F4-F2-F3-F4

The implementation described above further deters any attempts by malign parties to analyse the function by analysing any patterns of repeated codes areas or external function calls.

In step 114 of FIG. 1b, external functions that embed the FSM and partial FSMs generated from the primary function can also be flattened. This is so that other functions into which elements of the flattened primary function are incorporated may also be flattened in an analogous manner as described above from steps 102 to steps 112. This helps in merging the partial FSMs relating to the primary function into secondary partial FSMs unrelated to the code that is to be protected, making the analysis of the primary function even more difficult.

Figure 5:
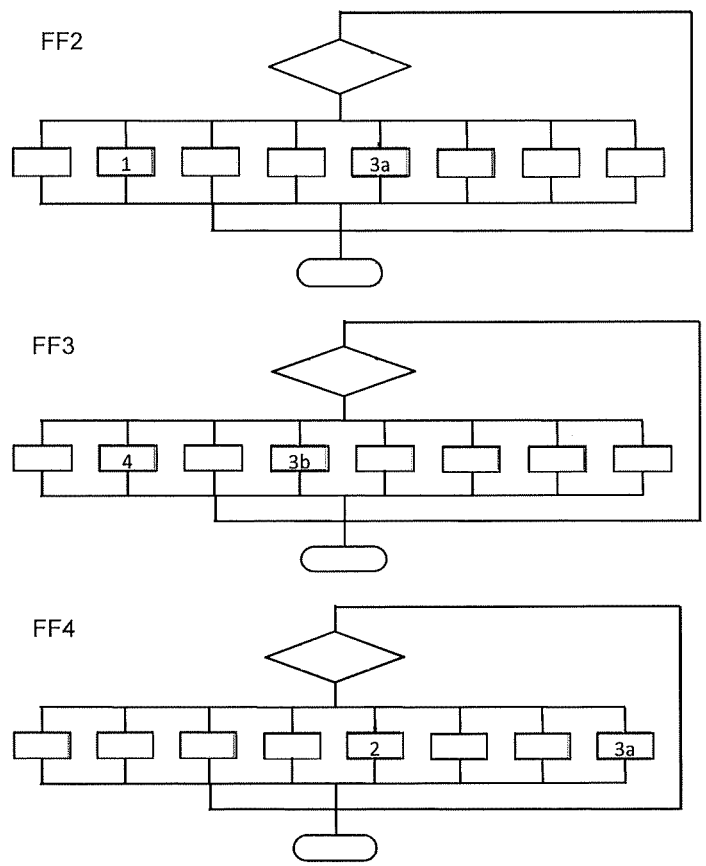
FIG. 5 schematically illustrates further flattening the other functions in FIG. 4.

FIG. 5, which refers to the partial FSMs F2, F3 and F4 in FIG. 4, shows these partial FSMs embedded in other unrelated functions in the code, after further flattening as flattened functions FF2, FF3 and FF4, relating to functions F2, F3 and F4, respectively.

Figure 6:
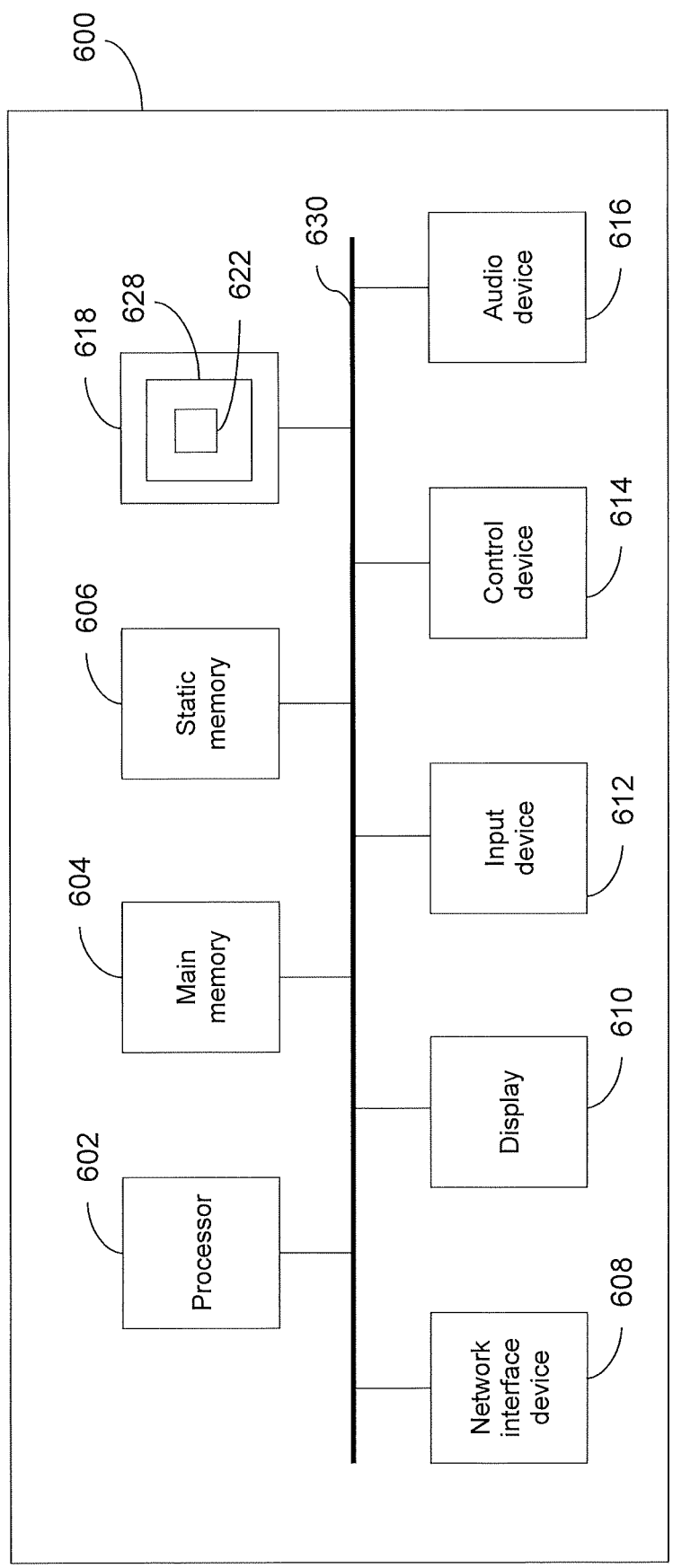
FIG. 6 shows a hardware infrastructure for implementing one or more embodiments and examples described herein.

FIG. 6 illustrates a block diagram of one implementation of a computing device 600 within which a set of instructions, for causing the computing device to perform any one or more of the methodologies discussed herein for providing software tamper resistance. In alternative implementations, the computing device 600 may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 600 includes a processing device 602, a main memory 604 (e.g., read-only memory (ROM), flash memory, dynamic random-access memory (DRAM) such as synchronous DRAM (SDRAM) or Rambus DRAM (RDRAM), etc.), a static memory 606 (e.g., flash memory, static random-access memory (SRAM), etc.), and a secondary memory (e.g., a data storage device 618), which communicate with each other via a bus 630.

Processing device 602 represents one or more general-purpose processors such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic (instructions 622) for performing the operations and steps discussed herein.

The computing device 600 may further include a network interface device 608. The computing device 600 also may include a video display unit 610 (e.g., a liquid crystal display (LCD) or a cathode ray tube (CRT)), an alphanumeric input device 612 (e.g., a keyboard or touchscreen), a cursor control device 614 (e.g., a mouse or touchscreen), and an audio device 616 (e.g., a speaker).

The data storage device 618 may include one or more machine-readable storage media (or more specifically one or more non-transitory computer-readable storage media) 628 on which is stored one or more sets of instructions 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid-state memory, magnetic tape, a removable computer diskette, a random-access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "generating", "determining", "identifying", "providing," "implementing,", "distributing", "detecting", "establishing", "changing/transforming" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A computer implemented method for generating protected code, comprising:
   identifying a primary function in code to be obscured;
   generating a finite state machine from the primary function, wherein a state of the finite state machine at a given instance defines an element of the primary function to be executed;
   generating a plurality of partial finite state machines from the finite state machine;
   distributing the partial finite state machines throughout the code.

2. The method according to claim 1, wherein step of generating a finite state machine includes flattening the primary function.

3. The method according to claim 2, wherein the step of flattening includes expanding one or more elements of the primary function to be expressed linearly within the primary function.

4. The method according to claim 1, wherein prior to generating the finite state machine, the method includes incorporating one or more sub-functions called by the primary function into the code of the primary function.

5. The method according to claim 2 further comprising changing local variables of the primary function to global variables accessible outside the primary function in the code.

6. The method according to claim 1, wherein the step of generating a plurality of partial state machines further comprises: identifying a plurality of basic blocks of the finite state machine, wherein each basic block includes at least one element of the primary function that can be executed to obtain an intermediate result; creating a void function for identified each basic block of the primary function to generate the partial finite state machine.

7. The method according to claim 1, further comprising generating one or more secondary finite state machines from other functions in the code.

8. The method according to claim 7, wherein the step of distributing further comprises incorporating the finite state machine generated for the primary function into the one or more secondary finite state machines.

9. The method according to claim 1, wherein the primary function is a function to verify the integrity of the code by performing background checks during execution of the primary function.

10. The method according to claim 1, wherein the primary function is a void function which does not return a value.

11. The method according to claim 1, wherein the primary function is repeatedly accessed or called at run time when the code is executed.

12. A computing device including one or more processors and a memory; the memory configured for storing code that is to be obscured, and the one or more processors configured to execute instructions to implement the method as claimed in claim 1.

* * * * *